Figure 1:
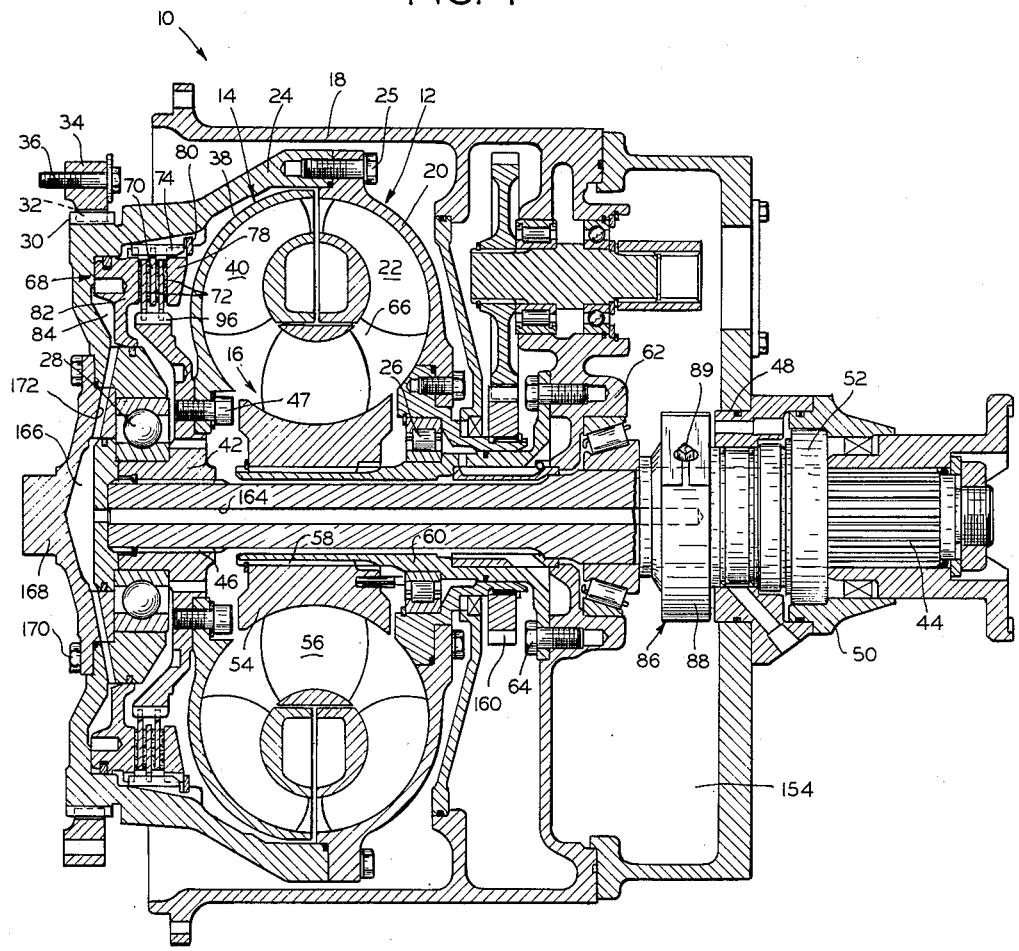

March 15, 1966  B. L. FROST  3,240,308
CONTROL SYSTEM FOR HYDRODYNAMIC DEVICE
Filed Dec. 30, 1963  2 Sheets-Sheet 1

INVENTOR
BARRY L. FROST
BY Robert H Johnson
ATTORNEY

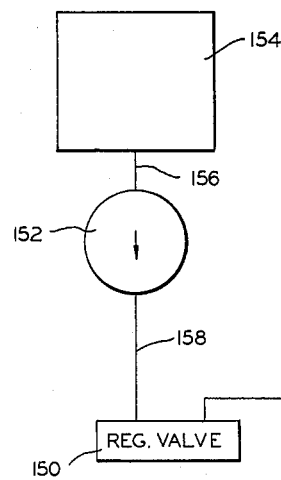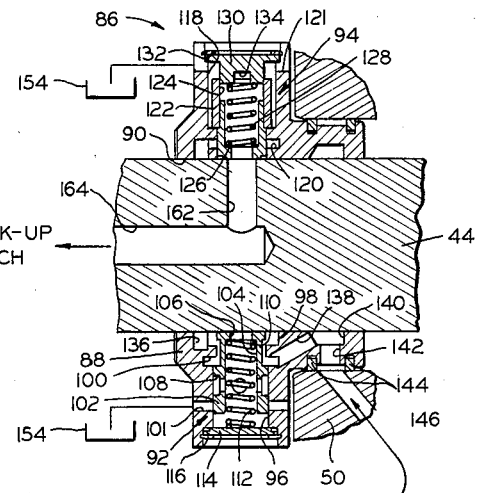
FIG. 2
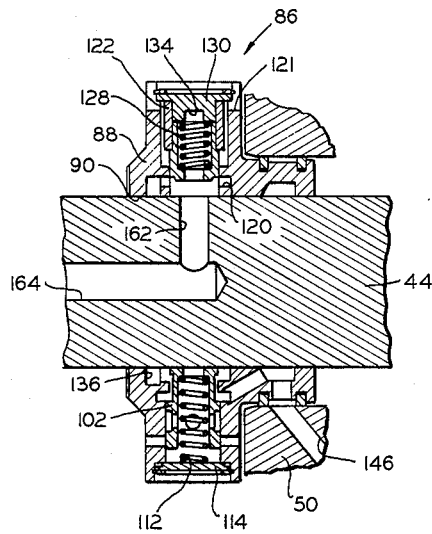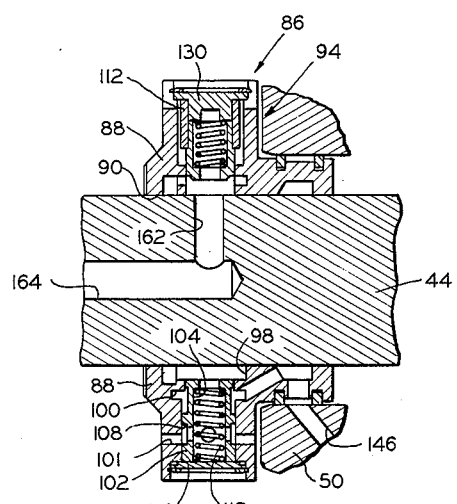
FIG. 3
FIG. 4
INVENTOR
BARRY L. FROST
BY Robert H Johnson
ATTORNEY United States Patent Office 3,240,308
Patented Mar. 15, 1966

3,240,308
CONTROL SYSTEM FOR HYDRODYNAMIC DEVICE
Barry L. Frost, Jackson, Mich., assignor to Clark Equipment Company, a corporation of Michigan
Filed Dec. 30, 1963, Ser. No. 334,293
6 Claims. (Cl. 192—103)

This invention relates to a control system for hydrodynamic devices, and more specifically to a control system for a hydrodynamic torque converter adapted to have the driving and driven members coupled together for conjoint rotation.

Hydrodynamic torque converters characteristically experience a drop in efficiency as the speed of the driven member approaches the speed of the driving member. In order to avoid this drop in efficiency it is common practice to couple the driving and driven members together for conjoint rotation after the speed of the driven member has approached the speed of the driving member to the extent that there is a noticeable drop in the efficiency of the torque converter. Conventionally, a clutch is used to couple the driving and driven members together, and there are many complex control systems available for controlling engagement and disengagement of the clutch which couples the driving and driven members together. Therefore, it is an object of the present invention to provide a control system for automatically coupling and uncoupling the driving and driven members of a hydrodynamic device that is simple and inexpensive.

Hydrodynamic torque converters often are utilized in the drive trains used in heavy-duty road construction machinery and the like, such as tractor dozers and tractor scrapers. In such machines the prime mover generally is governed to operate at a single speed. Consequently, it is necessary to sense only the speed of the driven member of the torque converter in order to determine when to lock the driving and driven members together. Thus, another object of my invention is to provide a control system for controlling the coupling together of the driving and driven members and which senses only the speed of the driven member.

In heavy-duty machines such as those mentioned hereinabove, there is a serious problem when the machines are descending a grade, especially when they are loaded, because due to the great weight of the machine and/or load the machine may tend to run faster than the prime mover is propelling it. Under such conditions power is transmitted back through the drive train, and if the torque converter has the driving and driven members locked together then it is possible to overspeed the prime mover due to the high rate of descent of the associated vehicle down the grade. Overspeeding of the prime mover is highly undesirable, and may result in extensive damage to it. Therefore, another object of my invention is to provide a control system which prevents overspeeding of the vehicle prime mover.

In carrying out my invention in a preferred embodiment thereof I provide a hydrodynamic torque converter with a clutch coupling the driving and driven members together and a control member for engaging the clutch at a predetermined speed of the driven member and disengaging the clutch at a second higher predetermined speed of the driven member.

Figure 5:
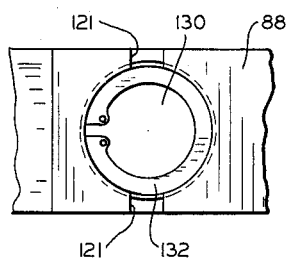

The above objects and other objects, features and advantages of my invention will become more readily apparent to persons skilled in the art from the following detailed description when taken in conjunction with the accompanying drawing in which:

FIGURE 1 is a longitudinal section of a hydrodynamic torque converter embodying my invention, FIGURE 2 is a partially schematic circuit showing the control member of my invention in section, FIGURES 3 and 4 are cross sections of the control member in different operating positions, and FIGURE 5 is a fragmentary top view of the control member.

Referring to FIG. 1, the reference numeral 10 denotes generally a hydrodynamic torque converter. Torque converter 10 includes a driving member 12, a driven member 14 and a reaction member 16 all disposed within a casing 18.

Driving member 12 includes an impeller or annular bladed wheel member 20 having a plurality of blades 22 and an annular connecting member 24 which is secured to impeller member 20 by means of a plurality of machine screws 25. Driving member 12 is rotatably journaled at one end thereof by means of a roller bearing 26 and rotatably journaled at the other end thereof by means of a ball bearing 28. Connecting member 24 is adapted to be connected to a prime mover by means of external teeth 30 which mesh with internal teeth 32 on a ring gear 34 which is connected to the fly wheel of the prime mover by means of bolts 36.

Driven member 14 includes a turbine or annular bladed wheel member 38 having a plurality of blades 40 and a connecting member 42 which is splined to an output shaft 44 at 46 and secured to turbine member 38 by a plurality of machine screws 47. Output shaft 44 extends outwardly through casing 18 at an annular opening 48 and is rotatably journaled in a support member 50 by means of a bearing 52.

Reaction member 16 includes an annular bladed wheel member 54 having a plurality of blades 56. Bladed wheel 54 is splined to a stationary support sleeve 58 at 60. Support sleeve 58, in turn, is connected to a wall portion 62 of casing 18 by means of a plurality of machine screws 64.

Impeller member 20, turbine member 38 and reaction member 16 are disposed in confronting relation and define a torus chamber 66 which is adapted to be filled with fluid in a conventional and well-known manner. Rotation of impeller member 20 causes the fluid contained within torus chamber 66 to circulate and impinge upon blades 40 of turbine member 38 and blades 56 of the reaction member 16 with the result that turbine member 38 is driven and, under certain conditions, there is a torque multiplication.

Disposed between connecting member 24 and turbine member 38 is a hydraulically actuated multiple disk type clutch 68. Clutch 68 includes an annular disk member 70 disposed between a pair of disk members 72. Disk member 70 is carried by and axially slidable along a splined portion 74 of connecting member 24 and disk members 72 are carried by and axially slidable along a splined portion 76 of connecting member 42. Disks 70 and 72 are disposed between an annular back-up plate 76 carried by splined portion 74 and held in place by a snap ring 80 and an axially slidable piston member 82 also engaging splined portion 74. Piston member 82 defines with a portion of connecting member 24 an annular fluid chamber 84 which when filled with pressure fluid forces piston member 82 to the right, as viewed in FIG. 1, and compresses disks 70 and 72, thereby engaging clutch 68 and connecting driving member 12 and driven member 14 together for conjoint rotation.

Referring now also to FIGS. 2 through 5, output shaft 44 carries an annular control member 86 which has a body 88 with an annular opening 90 through which shaft 44 extends. Body 88 is fixed to shaft 44 for rotation therewith by means of a lock screw 89 which engages shaft 44. Control member 86 also includes a valve 92 and a valve 94.

Valve 92 includes a radially outwardly extending bore 96 in body 88. Bore 96 has a pair of longitudinally spaced-apart annular grooves 98 and 100 cut in the wall thereof and a plurality of openings 101 which connect bore 96 with the exterior of body 88. Slidably disposed in bore 96 is a spool 102 which has a longitudinally extending bore 104 therein with a shoulder 106 at one end thereof, a plurality of annular openings 108 connecting the outer periphery of the spool with bore 104 and an annular groove 110 cut in the outer periphery of the spool. Valve 92 also includes a compression spring 112 disposed within bore 104 in abutment with shoulder 106 at one end thereof and with a cap member 114 at the other end thereof which is held in place by a snap ring 116.

Valve 94 includes a radially outwardly extending bore 118 in which an annular groove 120 is cut and a pair of notches 121 (FIG. 5) in body 88 which communicate with bore 118. Slidably disposed in bore 118 is a spool 122 which has a longitudinally extending bore 124 therein with a shoulder 126 adjacent one end thereof. Disposed in bore 124 is a compression spring 128 which abuts with shoulder 126 at one end thereof and a cap member 130 at the other end thereof. The cap member 130 includes a notch 134 and is held in place in bore 118 by means of a snap ring 132. Control member 86 includes an annular groove or fluid passage means 136 which connects grooves 98 and 120, and thus connects valves 92 and 94. A fluid passage 138 connects groove 100 of valve 92 with an annular groove 140 which is connected by means of a fluid passage 142 to the outside of body 88 between a pair of sealing rings 144. Pressure fluid is supplied to the end of fluid passage 142 adjacent sealing rings 144 by means of a fluid passage 146 in support member 50. Pressure fluid is conducted to fluid passage 146 by means of a conduit 148 which is connected to a regulating valve 150 that regulates the pressure of the fluid supplied to control member 86. The regulating valve 150 receives pressure fluid from a pump 152. Pump 152 draws fluid from a sump or reservoir 154 via a conduit 156 and supplies it to regulating valve 150 by means of a conduit 158. Fluid reservoir 154 is formed between wall portion 62 and the rear end of casing 18. It will be understood, although it is not shown in FIG. 1, that pump 152 may be disposed within casing 18 and driven from gear 160 which is connected to impeller 20.

Valve 94 is connected to chamber 84 for actuating piston 82 to engage clutch 68 by means of a fluid passage 162 drilled in output shaft 44 which connects with another drilled passage 164 that opens into a chamber 166 defined by a cap member 168 secured to connecting member 24 by means of machine screws 170. Chamber 166 is in communication with chamber 84 by means of a drilled passage 172 which extends through a portion of cap member 168 and supporting member 24.

Turning now to the operation of my invention, it will be assumed that it is associated with a vehicle which is moving at a slow rate of speed. Under such operating conditions the control member 86 will be rotating with output shaft 44 and valves 92 and 94 will be in the position shown in FIG. 2. That is, spools 102 and 122 will be biased into abutment with shaft 44. With spool 102 in this position pressure fluid supplied to groove 100 is communicated via groove 110 to groove 98 and hence via groove 136 to groove 120 where it is blocked by spool 122. At the same time chamber 84 is connected with sump 154 in which control member 86 is disposed via various fluid passages including passages 162 and 164, bore 124, notch 134, bore 118 and notches 121.

Now, as the vehicle's speed increases, the speed of the driven member 14 approaches the speed of the driving member 12 so that the efficiency of the torque converter 10 begins to drop off, and thus it is desirable to lock the driving and driven members together for conjoint rotation. When this speed of the driven member 14 is reached the centrifugal force acting on spool 122 is high enough to overcome the bias of spring 128 so that spool 122 moves outwardly into abutment with cap member 130; however, this centrifugal force is not yet high enough to overcome the bias of spring 112 to move spool 102 outwardly against cap 114. This operating condition of control member 86 is shown in FIG. 3. With spools 102 and 122 in the positions shown in FIG. 3 pressure fluid supplied to control member 86 via passage 146 is directed to chamber 84 since spool 122 no longer blocks communication between groove 120 and drilled passage 162. Further, spool 122 now blocks fluid communication between notch 134 and notches 121. As a result pressure fluid is directed to chamber 84 which is not longer vented to sump 154, and thus clutch 68 is engaged to lock driving member 12 and driven member 14 together for conjoint rotation.

Assuming now that the vehicle with which the present invention is associated is descending a grade which is sufficiently steep enough to cause the vehicle speed to accelerate, the vehicle will tend to drive the power train at a higher rate of speed than the prime mover is driving it. When this occurs and the vehicle speed reaches a predetermined rate the centrifugal force exerted on spool 102 will be sufficient to overcome the bias of spring 112, thereby allowing spool 102 to move into abutment with cap member 114. At the same time spool 120 will already be in abutment with cap member 130. Under this operating condition the spools 102 and 122 will be in the positions shown in FIG. 4. With spool 102 in the position shown in FIG. 4 fluid communication between grooves 100 and 98 is blocked by the spool so that pressure fluid from fluid passage 146 can no longer be supplied to valve 94. At the same time spool 102 serves to place groove 98 in communication with sump 154 via bore 104 and openings 108 and 101 which communicate bore 104 with the exterior of body 88, and thus with sump 154. As a result the pressure fluid in chamber 84 is vented to sump 154 so that clutch 68 is disengaged and driving member 12 and driven member 14 are no longer locked together for conjoint rotation, whereby overspeeding of the prime mover is prevented.

The above detailed description of a preferred embodiment of my invention is intended to be illustrative only, and therefore should not be considered as limiting the scope of my invention since many changes will be apparent to those skilled in the art and will not necessarily depart from the scope and spirit of my invention. For example, while the invention is described in conjunction with a hydrodynamic torque converter it will be appreciated that it is equally applicable to a fluid coupling. Consequently, the limits of my invention should be determined from the following appended claims taken in conjunction with the prior art.

I claim:

1. For use with a hydrodynamic device having a driving member, a driven member and a clutch for locking the driving and driven members together, a fluid reservoir and a source of pressure fluid connected to the reservoir to draw fluid therefrom, a control member comprising a body connected to the driven member for rotation therewith, a first valve carried by the said body and connected to the pressure fluid source, a second valve carried by the said body and connected to the lock-up clutch, and fluid passage means connecting the said valves, the said first valve being actuatable by centrifugal force from a first position in which it connects the said fluid passage means to the pressure fluid source to a second position in which it connects the said passage means to the reservoir, the said second valve being actuatable by centrifugal force from a first position in which it connects the lock-up clutch to the reservoir to a second position in which it connects the lock-up clutch to the said fluid passage means.

2. For use with a hydrodynamic device having a driving member, a driven member and a clutch for locking the driving and driven members together, a fluid reservoir and a source of pressure fluid connected to the reservoir to draw fluid therefrom, a control member connected to the driven member for rotation therewith, the said control including valve means connected to the pressure fluid source, lock-up clutch and reservoir and operative to connect the lock-up clutch to the reservoir below a first driven member speed, connect the lock-up clutch to the pressure fluid source at the said first driven member speed and reconnect the lock-up clutch to the reservoir at a second driven member speed which is higher than the first driven member speed.

3. For use with a hydrodynamic device having a driving member, a driven member and a lock-up clutch for conecting the driving and driven members together for conjoint rotation, a fluid sump and a pump connected to the sump to draw fluid therefrom, a control member comprising a body connected to the driven member for rotation therewith, a first valve connected to the pump, a second valve connected to the lock-up clutch, and fluid passage means connecting the said valves, the said first valve including a radially outwardly extending bore in the said body, a spool slidably disposed in the said bore and actuatable by centrifugal force from an inner position in which the said fluid passage means is connected with the pump to an outer position in which the said fluid passage means is connected with the sump, and spring means biasing the said spool to the said inner position, the said second valve including a radially outwardly extending bore in the said body, a spool slidably disposed in the said second-mentioned bore and actuatable by a centrifugal force which is less than the first-mentioned centrifugal force from an inner position in which the lock-up clutch is connected to the sump to an outer position in which the lock-up clutch is connected to the said fluid passage means and spring means biasing the second-mentioned spool to the second-mentioned inner position.

4. For use with a hydrodynamic device having a driving member and a driven member, a control system comprising a clutch for connecting the driving and driven members together for conjoint rotation, a fluid reservoir, a fluid pump connected to the said reservoir to draw fluid therefrom, and a control member connected to the driven member for rotation therewith, the said control member including valve means connected to the said pump, clutch and reservoir and operative to connect the said clutch to the said reservoir below a first driven member speed, connect the said clutch to the said pump at the said first driven member speed and reconnect the said clutch to the said reservoir at a second driven member speed which is higher than the said first driven member speed.

5. For use with a hydrodynamic device having a driving member and a driven member, a control system comprising a clutch for connecting the driving and driven members together for conjoint rotation, a fluid reservoir, a fluid pump connected to the said reservoir to draw fluid therefrom, and a control member, the said control member having a body connected to the driven member for rotation therewith, a first valve carried by the said body and connected to the said clutch pump, a second valve carried by the said body and connected to the said clutch and fluid passage means connecting the said valves, the said first valve being actuatable by a centrifugal force from a first position in which the fluid passage means is connected to the pump to a second position in which the fluid passage means is connected to the reservoir, the said second valve being actuatable by a centrifugal force which is less than the first-mentioned centrifugal force from a first position in which the said clutch is connected to the said reservoir to a second position in which the said clutch is connected to the said fluid passage means.

6. For use with a hydrodynamic device having a driving member and a driven member, a control system comprising a clutch for locking the driving and driven members together for conjoint rotation, a fluid sump, a fluid pump connected to the said sump to draw fluid therefrom, and a control member, the said control member including a body connected to the driven member for rotation therewith, a first valve connected to the said pump, a second valve connected to the said clutch, and fluid passage means connecting the said valves, the said first valve including a radially outwardly extending bore in the said body, a spool slidably disposed in the said bore and actuatable by centrifugal force from an inner position in which the said fluid passage means is connected with the said pump to an outer position in which the said fluid passage means is connected with the said sump, and spring means biasing the said spool to the said inner position, the said second valve including a radially outwardly extending bore in the said body, a spool slidably disposed in the second-mentioned bore and actuatable by a centrifugal force which is less than the first-mentioned centrifugal force from an inner position in which the said clutch is connected to the said sump to an outer position in which the said clutch is connected to the said fluid passage means, and spring means biasing the second-mentioned spool to the second-mentioned inner position.

References Cited by the Examiner
UNITED STATES PATENTS

| | | | |
|---|---|---|---|
| 2,271,919 | 2/1942 | Jandasek | 192—3.2 |
| 2,535,924 | 12/1950 | Hobbs | 192—103 |
| 2,597,921 | 5/1952 | Churchill et al. | 192—3.2 |

DAVID J. WILLIAMOWSKY, *Primary Examiner.*